Patented Sept. 30, 1952

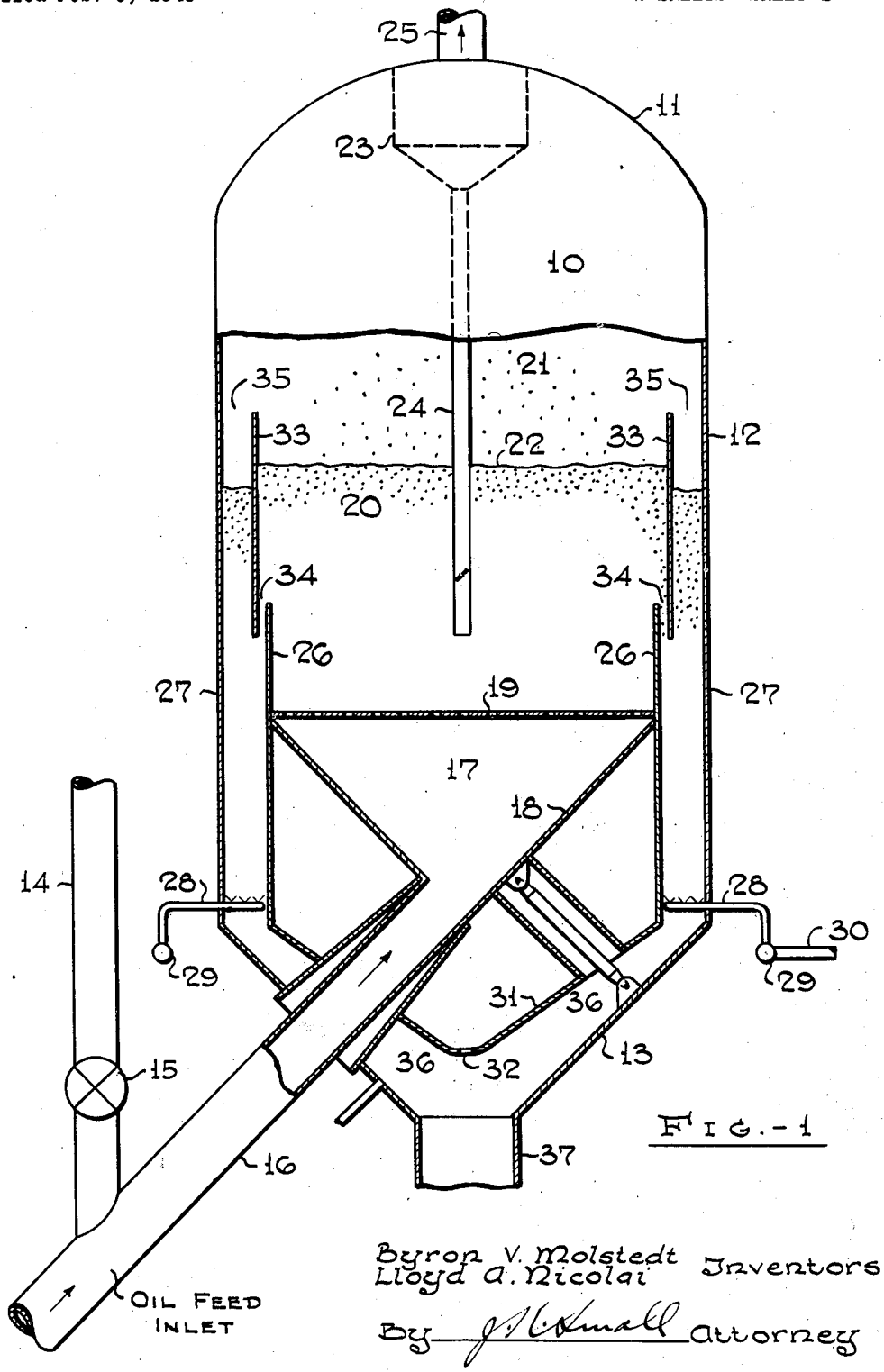

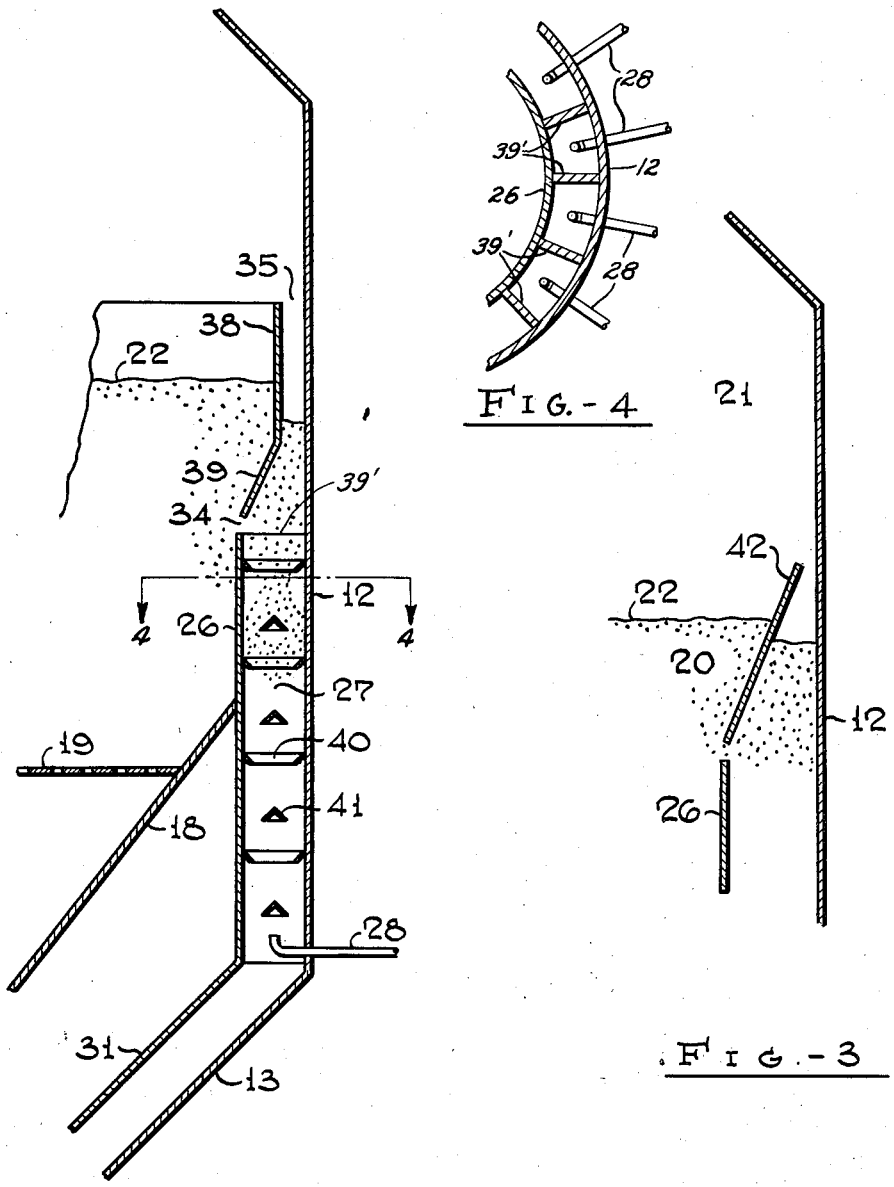

2,612,433

UNITED STATES PATENT OFFICE 2,612,433

MODIFICATION OF ANNULAR STRIPPER

Lloyd A. Nicolai and Byron V. Molstedt, Baton Rouge, La., assignors to Standard Oil Development Company, a corporation of Delaware Application February 5, 1948, Serial No. 6,444

11 Claims. (Cl. 23—1)

This invention pertains to an improved apparatus for carrying out catalytic reactions wherein finely divided catalyst particles are held in suspension in the reactant materials and particularly to the stripping of adsorbed and/or entrained fluidal materials from the solid catalyst particles utilized in the catalytic conversion of hydrocarbons.

There has been developed in recent years in certain catalytic operations, a method which is commonly referred to as the fluid catalyst method or technique in which finely divided solid catalyst particles are carried through a reaction zone in a stream of vapors undergoing reaction. This method or technique is applicable to a wide variety of catalytic reactions and while for purposes of illustration this invention will be specifically described in connection with the catalytic cracking of hydrocarbons, it is to be understood that the invention is not limited thereto but may be used in other catalytic processes or in other catalytic conversions of hydrocarbons where it is desired to remove vapors or gases from dense, fluidized, liquid-simulating mixtures of solid catalyst particles and gaseous fluids.

In general, in the fluid catalyst method the vaporous reactants and catalysts are introduced into the bottom of the reaction vessel, passed upwardly therethrough and are discharged into separation equipment in which the catalyst particles are separated from the vaporous products and returned to the reaction vessel preferably after regeneration. In a modified or improved design of catalytic cracking unit, the finely divided catalysts or contact particles are continuously introduced into the reaction vessel with the hydrocarbon materials to be cracked and the velocity of the vapors is so controlled that the catalyst particles are maintained in a dense, dry, fluidized, liquid-simulating condition in the lower portion of the reaction zone. The hydrocarbon vapors or gases pass upwardly through the dense, fluidized mixture of catalyst particles at controlled velocities as indicated and the vaporous products are taken overhead from the reaction zone.

During the cracking of hydrocarbons and also in other catalytic conversions of hydrocarbon materials, coke or carbonaceous materials are deposited on the catalyst or contact particles thereby reducing or destroying their catalytic activity. The contaminated or spent catalyst particles must be regenerated before being reused in the cracking or other catalytic operation. In the regeneration, the contaminated or spent catalyst particles are withdrawn as a dense, fluidized mixture from the lower portion of the reaction zone and the carbon or other combustible deposits are contacted with air or other regenerating gas which burns off the carbonaceous deposits.

The contaminated, spent catalyst or contact particles withdrawn from the lower portion of the reaction zone contain entrained hydrocarbon vapors or gases and before regenerating the particles it is preferred practice to remove the entrained hydrocarbons in a stripping or purging operation. The efficient stripping of hydrocarbon vapors from the spent catalyst remains an important and pressing problem even after several years of commercial operation of fluid catalyst cracking plants. Most of the commercial units are limited in their throughput by the capacity of their carbon burning systems, yet 10 to 30% of the oxygen supplied to the regenerative system goes to the combustion of gaseous or strippable hydrocarbons carried to the regenerator by the spent catalyst. Besides greatly reducing the feed throughput, these strippable hydrocarbons, amounting to anywhere from 0.5 to 1.5 weight per cent on feed, represent a sizable loss of potential products. The present invention relates to an improved design for a stripping or purging section or zone for a fluidized solids reactor.

In accordance with the present invention the mixture of catalyst or contact particles and the hydrocarbons or other reactants are introduced into the bottom portion of a reaction zone wherein the catalyst is maintained as a dry, dense, liquid-simulating fluidized bed and catalyst is continuously withdrawn from the fluidized bed and passed through a stripping zone. The stripping zone is preferably of annular form and arranged adjacent the wall of the lower portion of the reaction zone. The stripping zone may be a continuous annulus or it may be subdivided into a large number of cells by means of radial baffles and the single annulus or the individual cells may be provided with suitable baffles for increasing contact of catalyst particles and stripping gas which is introduced at the bottom of the stripping zone. In accordance with the present invention separate catalyst entrance ports and separate stripping gas exit ports are provided in the stripping zone, the catalyst entrance ports being arranged below the level of the dense, fluidized bed-dilute phase interface and the stripping gas exit ports being arranged well up into the dilute phase. By means of this arrangement recycling of vapors and catalyst at the entrance to the stripper is decreased and introduction of steam or other stripping gas into the active reaction zone or dense fluidized bed is avoided. If desired, steam or other stripping agent may be injected into the catalyst entrance ports to the stripping zone. In view of the relatively high catalyst velocity in these ports, good mixing of catalyst and stripping agent can be attained by injecting the stripping agent into the catalyst entrance ports.

Reference is made to the accompanying drawings illustrating the present invention:

In the drawings, Fig. 1 is a vertical elevation, partly in section of a reaction vessel embodying the present invention.

Fig. 2 is a vertical cross section of a stripper cell provided with another form of baffle suitable for forming separate catalyst inlet ports and separate stripping gas outlet ports for the stripper cell;

Fig. 3 is a cross-section of a different form of baffle; and

Fig. 4 is a partial sectional view taken on line 4—4 of Fig. 2 with the disc and donut baffles omitted from the cells to show the radial baffles and stripping gas inlets.

Referring to Fig. 1 of the drawing, the reaction vessel 10 comprises an upper dome section 11, a cylindrical middle portion 12 and a conical bottom portion 13. Catalyst particles are supplied from a hopper (not shown) through a standpipe or the like 14 which is equipped with a valve 15 for controlling the rate at which the catalyst particles are discharged into the oil feed inlet line 16. Oil in vaporized form or partially in vaporized form is supplied to the inlet line 16 from a suitable source (not shown).

The suspension of solid catalyst or contact particles in reactant vapors is passed through feed line 16 into an inlet chamber 17 comprising an upwardly flared conical wall member 18 having a grid member or perforated distribution plate member 19 arranged substantially horizontally at its upper end. In the form of apparatus shown, the reaction vessel is circular in cross-section and the grid member 19 is also circular and is disposed centrally of the reaction vessel. The diameter of the grid member or distribution plate 19 is less than the internal diameter of the reaction vessel in order to provide an annular passageway for the withdrawal of catalyst particles from the lower portion of the reaction vessel as will be hereinafter described in greater detail.

The velocity of the gaseous reactant fluid passing upwardly in the reaction vessel 10 is preferably so controlled as to maintain the solid contact or catalyst particles as a dry dense, liquid-simulating, fluidized bed of catalyst particles 20. The vaporous reaction products leaving the dense bed 20 entrain a small amount of solid catalyst particles forming a dilute phase or suspension designated at 21 in the upper portion of the reaction vessel 10. The level of the dense bed or the dense bed-dilute phase interface is indicated at 22.

The reaction products and entrained catalyst particles are passed through separating means 23 arranged at the top of the reaction vessel. This separating means, which may be a cyclone separator or the like, separates most of the entrained solid catalyst particles from the vaporous reaction products. The solid catalyst particles separated in the cyclone 23 are returned to the dense bed 20 through the dip leg or pipe 24 which extends below the upper level 22 of the dense bed. A valve for controlling the return of catalyst particles to the dense bed and means for introducing a suitable fluidizing gas may be provided in the dip leg 24. The vaporous reaction products leaving the cyclone or separating means 23 pass overhead through line 25 to any suitable equipment to effect further removal of entrained solids and to recover the desired products. In the catalytic cracking or conversion of hydrocarbons, the vaporous reaction products are passed to a fractionating system to separate gasoline or motor fuel from gases and hydrocarbon constituents boiling above the motor fuel range.

A cylindrical sleeve or skirt 26 extending a substantial distance above and below the distribution plate 19 is arranged around the distribution plate to provide an annular passageway 27 for the withdrawal of catalyst particles from the dense bed 20. This annular space can, if desired, be subdivided into a multiplicity of long, narrow cells by providing radial baffle plates between the reactor shell 12 and the cylindrical skirt 26. Inlets 28 are provided for the introduction of a suitable stripping agent such as steam or the like. The stripping gas inlets are arranged around the reactor and are preferably connected to a manifold 29 which in turn is connected by line 30 to a source of supply of stripping gas. The annular stripping space or the long narrow cells above described can be provided with baffles to cause the catalyst to follow a zig zag course downwardly through the stripping space as the stripping gas passes upwardly countercurrent to the catalyst particles thereby increasing the contact of catalyst particles and stripping medium.

A conical baffle or wall member 31 is secured to the bottom of the sleeve member 26 for reducing the effective volume below the inlet chamber 17. The conical member 31 is arranged substantially equidistant from the lower conical section 13 of the reactor and is provided with a vent hole 32. A steam bleeding line (not shown) is ordinarily connected into the chamber formed between conical wall members 18 and 31 and cylindrical sleeve member 26 in order to prevent the accumulation of fine catalyst particles and hydrocarbon materials therein.

In accordance with the present invention, a cylindrical or other suitable baffle 33 is arranged in the reactor in order to provide separate catalyst inlet ports to the stripping section and a separate stripping gas outlet port from the stripping section. As shown in Fig. 1, this baffle may be a cylindrical shell or sleeve of greater inside diameter than the external diameter of the cylindrical sleeve member 26 and is arranged concentrically with said sleeve member 26. The difference in diameters of said cylindrical members determines the size of the opening or catalyst inlet port 34 to the stripping section 27. Instead of making the baffle in the form of a separate cylindrical shell or sleeve, it can be formed by merely extending the cylindrical sleeve member 26 upwardly above the maximum dense bed level and inlets to the stripping zone can be provided in the form of holes of any desired or suitable size and shape. By making the catalyst inlet port of sufficiently small cross-sectional area a pressure drop of the order of about 0.5 to 5.0 pounds per sq. in. can be provided between the dense bed 20 and the stripping section 27. This pressure drop effectively prevents recycling of catalyst particles and vapors from the stripping zone back into the dense bed. Also by restricting the catalyst inlet port, catalyst is distributed evenly to all portions of the stripping zone in spite of surging which may occur in the reaction bed.

The baffle 33 is of sufficient height to extend well above the maximum level 22 of the dense bed. In this way, the stripping gas exit port 35 is located well up into the dilute phase 21 so that the stripping gas such as steam or the like is discharged from the stripping section directly into the dilute phase. If it is desired to inject steam or stripping agent directly into the catalyst inlet ports, a manifold may be arranged on the cylindrical sleeve 26 or on the baffle 33 or on both with nozzles or orifices which discharge directly into the catalyst inlet ports connected to said manifolds.

The catalyst particles discharged from the stripping section 27 flow downwardly through the annular conical passageway 36 formed between conical bottom section 13 and conical wall member 31 and are discharged into a standpipe 37 which leads to a regenerator for revivifying the spent stripped catalyst in known manner. As is well known in the art, the standpipe 37 is provided with a slide valve (not shown) to control the rate of withdrawal of solids from the dense bed 20.

The baffle member 33 need not be of cylindrical shape since other forms are equally if not more suitable. Other forms of baffles which may be used are shown in Figs. 2 and 3. In Fig. 2, only a portion of the perforated distribution plate 19 and modified form of conical wall member 18 are shown. The baffle for providing separate catalyst inlet ports and stripping gas outlet ports comprises an upper cylindrical portion 38 and a lower, inwardly flared or inverted frusto-conical portion 39 the smaller portion of which has a diameter substantially the same as the diameter of the cylindrical skirt or sleeve 26, the bottom of the baffle member being arranged in close proximity to the top of the cylindrical sleeve to form the restricted inlet port 34. As shown in this figure, the annular stripping zone or section 27 is subdivided into a plurality of cells by means of radial baffles of substantially the same height as the cylindrical sleeve 26 and the cell shown is further provided with baffles such as donut baffles 40 and disc baffles 41 in order to increase the contact of catalyst particles and stripping agent. The form of baffle shown in Fig. 2 has the advantage over the cylindrical baffle of Fig. 1 of making considerably more reactor volume available for useful work. The simplest form of baffle would be the inverted frusto-conical baffle 42 shown partially in Fig. 3 having its smallest diameter substantially equal to the diameter of the cylindrical sleeve 26 and its largest diameter slightly smaller than the diameter of the shell 12, the overall length of the baffle being sufficient to extend the upper edge thereof well up into the dilute phase 21.

The operation of the apparatus in accordance with the present invention will now be described in connection with the catalytic cracking of hydrocarbons. In such catalytic cracking operations the reactant fluid or feed stock comprises hydrocarbons such as gas oil, reduced crude, petroleum oil, whole crude and heavy naphthas in liquid or vapor form or partly in liquid and partly in vapor form. The catalyst or contact particles may comprise acid treated bentonitic clay, synthetic silica-alumina or silica-magnesia gels, or mixtures thereof with activators and promoters such as oxides of zinc, calcium, thorium, boron, zirconium, vanadium, chromium, molybdenum or the like or any other suitable cracking catalyst. The catalyst particles may be of any desired form, microspheroidal particles being particularly convenient. The major proportion of the catalyst particles are ordinarily from about 20 to 200 microns in diameter.

Hot powdered catalyst such as silica-magnesia cracking catalyst supplied from standpipe 14 and relatively heavy hydrocarbon oil such as gas oil supplied through the feed inlet in vaporized or partially vaporized condition are passed through inlet line 16 into the inlet chamber 17 at temperatures of between 800 and 1100° F. preferably at about 975° F. The catalyst to oil ratio may vary between about 5:1 and about 30:1 by weight. The mixtures of powdered catalyst and hydrocarbon vapors are passed from the inlet chamber 17 through the distribution plate or grid 19 into the reactor proper to form a dry, dense, liquid-simulating fluidized bed or mixture 20 in the reaction chamber. The velocity of the vaporized hydrocarbon material through the bed is from about 0.6 to 2.0 ft. per second and the density of the catalyst in the dense bed 20 varies from about 10 to 45 lbs. per cu. ft.

The vaporous reaction products leaving the dense bed 20 carry along small amounts of catalyst particles forming a dilute phase 21. The reaction products are discharged through the cyclone separators 23 which knock some of the catalyst particles out of the reaction product stream, the separated catalyst particles being returned to the dense bed 20 through dip leg 24 while vaporous reaction products pass overhead through line 25 to suitable recovery or treating equipment.

During the cracking operation the catalyst particles become spent by the deposition of coke or other carbonaceous materials thereon. In order to maintain the activity of the catalyst at the desired level, spent or contaminated particles are continuously withdrawn from the dense bed 20 through the restricted opening or catalyst inlet port 34 and discharged into the stripping section 27. In view of the pressure drop through the inlet port 34 there is little or no recirculation of the catalyst particles from the stripping section 27 back into the dense bed 20. As the spent catalyst particles descend through the stripping section they are contacted countercurrently with steam or other suitable stripping gas applied through nozzles 28 in order to remove hydrocarbon vapors and gases entrained in the catalyst particles leaving the dense bed. The stripping gas and the hydrocarbon materials separated from the catalyst particles pass upwardly through the stripping section and are discharged through ports 35 directly into the dilute phase 21. The level of the catalyst in the stripping cell is governed mainly by the pressure drop through the catalyst inlet and ordinarily is a little below the level 22 of the dense bed in the reactor proper when the vapor velocity in the stripper is substantially the same as in the reactor dense bed. The stripped catalyst particles pass into the conical passageway 36 and then into standpipe 37 whence the catalyst particles are discharged into a regenerator wherein the coke or carbonaceous deposits are burned off rendering the catalyst particles suitable for recycling to standpipe 14 and thence into the reaction vessel 10. Steam or other aerating gas may be introduced into passageway 36 in order to maintain the catalyst particles in fluidized form.

While the present invention has been specifically described in connection with the catalytic cracking of hydrocarbons, it is to be understood that the apparatus may be used for removing volatile materials from other solid contact particles in other reactions such as the dehydrogenation of butane or butylene fractions, aromatization of naphtha fractions, coking of heavy residues and the like; and also may be used generally in adsorption processes or in any reaction involving contact of solid particles with gaseous or vaporous reactants. For example, the apparatus could also be applied in the treatment of known hydrocarbon materials such as the oxidation of alcohols to aldehydes or acids or to the preparation of anhydrous hydrogen chloride.

While the best known forms of apparatus have been described above, it is to be understood that this is by way of illustration only and that various changes and modifications may be made without departing from the spirit of this invention.

What is claimed is:

1. An apparatus including a cylindrical vessel for contacting gasiform materials with finely divided solids adapted to be maintained as a dense, dry, liquid-simulating fluidized bed in the lower portion of said vessel, an inlet chamber in the bottom portion of said vessel for the supply of gasiform materials and solids thereto, a circular perforated distribution plate arranged substantially horizontally at the upper portion of said inlet chamber, said plate being concentric with said vessel but of smaller diameter, a vertically disposed cylindrical member surrounding said distribution plate and extending above it, said cylindrical member being spaced from the inner wall of said vessel to provide an annular passageway for the withdrawal of solids from the dense fluidized bed adapted to be maintained in said vessel, radial baffles extending between the inner wall of said vessel and the outer wall of said cylindrical member dividing said annular passageway into a plurality of long narrow stripping sections, means for introducing a stripping agent into the lower portion of each of said stripping sections, a cylindrical baffle member arranged adjacent to the upper end of said cylindrical member and extending upwardly above the maximum level of the dense, dry, liquid-simulating bed adapted to be maintained in said vessel, the lower end of said cylindrical baffle member being coextensive with the upper end of said cylindrical member and being uniformly spaced therefrom to provide a restricted opening from the dense fluidized bed adapted to be maintained in said vessel into said annular passageway, said cylindrical baffle member comprising an inverted frusto-conical section, the smallest diameter of which is substantially the same as the diameter of said cylindrical member and the largest diameter of which is a little less than the internal diameter of said vessel, and a cylindrical section provided on the upper end of said inverted frusto-conical section and of substantially the same diameter as the upper end of said frusto-conical section, the lower and smaller diameter of said baffle member being arranged in close proximity to the upper end of said cylindrical member to provide said restricted opening from the dense fluidized bed adapted to be maintained in said vessel directly into said annular passageway for the withdrawal of solids directly from the dense fluidized bed adapted to be maintained in said vessel into said annular passageway, said baffle member being spaced from the inner wall of the vessel to provide an outlet port well above the maximum level of the dense fluidized bed adapted to be maintained in said vessel for the discharge of stripping agent and stripped-out material released in said annular passageway, an outlet for gasiform material in the upper portion of said vessel and an outlet for solids in the lower portion of said vessel.

2. An apparatus including a cylindrical vessel for contacting gasiform materials with finely divided solids adapted to be maintained as a dense, dry, liquid-simulating fluidized bed in the lower portion of said vessel, an inlet chamber in the bottom portion of said vessel for the supply of gasiform materials and solids thereto, a circular perforated distribution plate arranged substantially horizontally at the upper portion of said inlet chamber, said plate being concentric with said vessel but of smaller diameter, a vertically disposed cylindrical member surrounding said distribution plate and extending above it, said cylindrical member being spaced from the inner wall of said vessel to provide an annular passageway for the withdrawal of solids from said dense fluidized bed adapted to be maintained in said vessel, radial baffles extending between the inner wall of said vessel and the outer wall of said cylindrical member dividing said annular passageway into a plurality of long narrow stripping sections, means for introducing a stripping agent into the lower portion of each of said stripping sections, a baffle member arranged adjacent to the upper end of said cylindrical member and extending upwardly above the maximum level of the dense, fluidized bed, adapted to be maintained in said vessel, the lower end of said baffle member being coextensive with the upper end of said cylindrical member and being uniformly spaced therefrom to provide a restricted opening from the dense fluidized bed adapted to be maintained in said vessel directly into said annular passageway for the withdrawal of solids directly from the dense fluidized bed adapted to be maintained in said vessel into said annular passageway, said baffle member comprising an inverted frusto-conical member, the smallest diameter of which is substantially the same as the diameter of said cylindrical member and the largest diameter of which is a little less than the internal diameter of said vessel, the lower end of said inverted frusto-conical member being in sufficiently close proximity to the upper end of said cylindrical member to provide said restricted opening for the withdrawal of solids directly from the dense fluidized bed adapted to be maintained in said vessel into said annular passageway and to produce a pressure drop through said restricted opening of from 0.5 to 5.0 lbs. per square inch, said baffle member being spaced from the inner wall of the vessel to provide an outlet port well above the maximum level of the dense fluidized bed adapted to be maintained in said vessel for the discharge of stripping agent and stripped-out material released in said annular passageway, an outlet for gasiform material in the upper portion of said vessel and an outlet for solids in the lower portion of said vessel.

3. An apparatus including a cylindrical vessel for contacting gasiform materials with finely divided solids adapted to be maintained as a dense, dry, liquid-simulating fluidized bed in the lower portion of said vessel, an inlet chamber in the bottom portion of said vessel for the supply of gasiform material and solids thereto, a circular perforated distribution plate arranged substantially horizontally at the upper portion of said inlet chamber, said plate being concentric with said vessel but of smaller diameter, a vertically disposed cylindrical member surrounding said distribution plate and extending above it, said cylindrical member being spaced from the inner wall of said vessel to provide an annular passageway for the withdrawal of solids from said dense fluidized bed adapted to be maintained in said vessel, radial baffles extending between the inner wall of said vessel and the outer wall of said cylindrical member dividing said annular passageway into a plurality of long narrow stripping sections, means for introducing a stripping agent into the lower portion of each of said stripping sections, a baffle member arranged adjacent to the upper end of said cylindrical member and extending upwardly above the maximum level of the dense, fluidized bed adapted to be maintained in said vessel, the lower end of said baffle member being coextensive with the upper end of said cylindrical member and being uniformly spaced therefrom to provide a restricted opening from the dense fluidized bed adapted to be maintained in said vessel directly into said annular passageway for the withdrawal of solids directly from the dense fluidized bed adapted to be maintained in said vessel into said annular passageway, said baffle member comprising an inverted frusto-conical section, the smallest diameter of which is substantially the same as the diameter of said cylindrical member and the largest diameter of which is a little less than the internal diameter of said vessel, and a cylindrical section provided on the upper end of the inverted frusto-conical section and of substantially the same diameter as said upper end of said frusto-conical section, the lower and smaller diameter end of said baffle member being arranged in sufficiently close proximity to the upper end of the cylindrical member to provide said restricted opening into said annular passageway giving a pressure drop of about 0.5 to 5.0 lbs. per square inch for the withdrawal of solids directly from the dense fluidized bed adapted to be maintained in said vessel into said annular passageway, said baffle member being spaced from the inner wall of the vessel to provide an outlet port above the maximum level of the dense fluidized bed adapted to be maintained in said vessel for the discharge of stripping agent and stripped-out material released in said annular passageway, an outlet for gasiform material in the upper portion of said vessel and an outlet for solids in the lower portion of said vessel.

4. An apparatus including a cylindrical vessel for contacting gasiform materials and finely divided solids adapted to be maintained as a dense, dry, liquid-simulating bed in the lower portion of said vessel with a dilute phase thereabove in the upper portion of said vessel, an inlet chamber in the bottom portion of said vessel for the supply of gasiform material and solids thereto, a circular perforated distribution plate arranged substantially horizontally at the upper portion of said inlet chamber, a vertically disposed cylindrical member surrounding said distribution plate and extending above said distribution plate and spaced from the inner wall of the vessel to provide an annular passageway for the withdrawal of solid particles from the dense fluidized bed adapted to be maintained in said vessel, a multiplicity of spaced inlet lines arranged entirely around said vessel for introducing stripping gas into the lower portion of said annular passageway at a multiplicity of spaced points entirely around said annular passageway, an annular baffle member forming an extension of the upper end of said cylindrical member and extending upwardly above the maximum level of the dense, dry, liquid-simulating bed adapted to be maintained in said vessel, said cylindrical member above said distribution plate being provided with a multiplicity of spaced restricted openings arranged entirely around said members and leading from the dense fluidized bed adapted to be maintained in said vessel directly into said annular passageway for the withdrawal of solids directly from the dense bed adapted to be maintained in said vessel into said annular passageway, said restricted openings being of such size to effect a substantial pressure drop from the dense fluidized bed adapted to be maintained in said vessel into said annular passageway, said annular baffle member being spaced from the inner wall of the vessel to provide an outlet port discharging into the dilute phase in the upper portion of said vessel above the maximum level of said dense fluidized bed adapted to be maintained in said vessel for the discharge of stripping gas and stripped-out material released in said annular passageway, an outlet for gasiform materials in the upper portion of said vessel and an outlet for solids in the lower portion of said vessel.

5. An apparatus according to claim 4 wherein said annular passageway is provided with vertically spaced, horizontally extending baffles to improve contacting between the solids and stripping gas therein.

6. An apparatus including a cylindrical vessel for contacting gasiform materials and finely divided solids adapted to be maintained as a dense, dry, liquid-simulating bed in the lower portion of said vessel with a dilute phase thereabove in the upper portion of said vessel, an inlet chamber in the bottom portion of said vessel for the supply of gasiform material and solids thereto, a circular perforated distribution plate arranged substantially horizontally at the upper portion of said inlet chamber, a vertically disposed cylindrical member surrounding said distribution plate and extending above said distribution plate and spaced from the inner wall of the vessel to provide an annular passageway for the withdrawal of solid particles from the dense fluidized bed adapted to be maintained in said vessel, a multiplicity of spaced inlet lines arranged entirely around said vessel for introducing stripping gas into the lower portion of said annular passageway at a multiplicity of spaced points entirely around said annular passageway, a baffle member arranged adjacent to and extending above the upper end of said cylindrical member and extending upwardly above the maximum level of the dense fluidized bed adapted to be maintained in said vessel, the lower end of said baffle member being substantially uniformly spaced from the upper end of said cylindrical member to provide a restricted opening leading from the dense fluidized bed adapted to be maintained in said vessel directly into said annular passageway for the withdrawal of solids directly from the dense bed adapted to be maintained in said vessel into said annular passageway, said restricted opening being of such size to effect a substantial pressure drop from the dense fluidized bed adapted to be maintained in said vessel into said annular passageway, said baffle member being spaced from the inner wall of the vessel to provide an outlet port discharging into the dilute phase in the upper portion of said vessel above the maximum level of said dense fluidized bed adapted to be maintained in said vessel for the discharge of stripping agent and stripped-out material released in said annular passageway, an outlet for gasiform materials in the upper portion of said vessel and an outlet for solids in the lower portion of said vessel.

7. An apparatus including a cylindrical vessel for contacting gasiform materials with finely divided solids adapted to be maintained as a dense, dry, liquid-simulating fluidized bed in the lower portion of said vessel, an inlet chamber in the bottom portion thereof for the supply of gasiform materials and solids thereto, a circular perforated distribution plate arranged substantially horizontally at the upper portion of said inlet chamber, said plate being concentric with said vessel but of smaller diameter, baffle means including a vertically disposed cylindrical member surrounding said distribution plate and extending above said distribution plate, said cylindrical member being spaced from the inner wall of said vessel to provide an annular passageway for the withdrawal of solids from the fluidized bed adapted to be maintained in said vessel, said baffle means also including an upper annular baffle portion forming an extension of the upper end of said cylindrical member and extending upwardly in said vessel above the maximum level of the dense, dry, liquid-simulating bed adapted to be maintained in said vessel, said baffle means being provided with a multiplicity of spaced restricted openings arranged in a circle entirely around said baffle means above said perforated distribution plate but below the minimum level of the dense fluidized bed adapted to be maintained in said vessel and leading from the dense fluidized bed adapted to be maintained in said vessel directly into said annular passageway for the withdrawal of solids directly from the dense fluidized bed adapted to be maintained in said vessel into said annular passageway, said restricted openings being of such size to produce a substantial pressure drop through said openings, a multiplicity of spaced inlet lines arranged entirely around said cylindrical vessel for introducing stripping gas at a multiplicity of spaced points into the lower portion of said annular passageway, the upper end of said annular baffle portion being spaced from the inner wall of said vessel to provide an outlet port above the maximum level of the dense fluidized bed adapted to be maintained in said vessel for the discharge of stripping agent and stripped out material released in said annular passageway, an outlet for gasiform material in the upper portion of said vessel and an outlet for solids in the lower portion of said vessel.

8. An apparatus according to claim 7 wherein said annular space is provided with vertically, horizontally extending baffles to improve contacting between the solids and stripping gas therein.

9. A process for contacting gaseous fluid and finely divided solids which comprises supplying gaseous fluid and finely divided solids to a cylindrical vessel, controlling the velocity of the gaseous fluid passing upwardly through said vessel to form a dense, fluidized, liquid-simulating bed of solids in the lower portion of said vessel with a dilute phase thereabove, removing gaseous fluid substantially free from solid particles from the dilute phase in the upper portion of said vessel, withdrawing solid particles as a multiplicity of separate streams directly from said dense fluidized solids bed at spaced points entirely around the periphery thereof and below the upper level thereof and passing the withdrawn solid particles as a multiplicity of streams into the intermediate portion of a confined annular stripping zone surrounding said dense fluidized bed of solids and at a region above the locus of introduction of gaseous stripping fluid hereinafter referred to, causing each of said streams to take a substantial pressure drop during passage of the streams from the dense fluidized bed into said annular stripping zone thereby equalizing the flow of solids from the dense fluidized bed into said annular stripping zone, contacting solids in said annular stripping zone with upflowing gaseous stripping fluid introduced at a multiplicity of points into the lower portion of said annuar stripping zone, said multiplicity of points being arranged in spaced relation entirely around said annular stripping zone, discharging solids from the bottom of said annular stripping zone into a collecting zone at the bottom of said vessel and withdrawing stripped solids from said collecting zone and passing gaseous stripping fluid and stripped out material from the upper portion of said annular stripping zone directly into said dilute phase above the level of the dense fluidized bed of solids in said vessel for removal from the upper portion of said vessel.

10. An apparatus including a cylindrical vessel for contacting gasiform materials and finely divided solids adapted to be maintained as a dense, dry, liquid-simulating bed in the lower portion of said vessel with a dilute phase thereabove in the upper portion of said vessel, an inlet chamber in the bottom portion of said vessel for the supply of gasiform material and solids thereto, a circular perforated distribution plate arranged substantially horizontally at the upper portion of said inlet chamber, a vertically disposed cylindrical member surrounding said distribution plate and extending above said distribution plate and spaced from the inner wall of the vessel to provide an annular passageway for the withdrawal of solid particles from the dense fluidized bed adapted to be maintained in said vessel, radial baffles extending between the inner wall of said vessel and the outer wall of said cylindrical member for subdividing said annular passageway into long narrow stripping sections, a multiplicity of spaced inlet lines arranged around said vessel for introducing stripping gas into the lower portion of each stripping section, an annular baffle member forming an extension of the upper end of said cylindrical member and extending upwardly above the maximum level of the dense, dry, liquid-simulating bed adapted to be maintained in said vessel, the junction of the lower end of said baffle member and the upper end of said cylindrical member being provided with a plurality of spaced restricted openings arranged around said members and leading from the dense fluidized bed adapted to be maintained in said vessel directly into said annular passageway for the withdrawal of solids directly from the dense bed adapted to be maintained in said vessel into said annular passageway, said restricted openings being of such size to effect a substantial pressure drop from the dense fluidized bed adapted to be maintained in said vessel into said annular passageway, said annular baffle member being spaced from the inner wall of the vessel to provide an outlet port discharging into the dilute phase in the upper portion of said vessel above the maximum level of said dense fluidized bed adapted to be maintained in said vessel for the discharge of stripping gas and stripped-out material released in said annular passageway, an outlet for gasiform materials in the upper portion of said vessel and an outlet for solids in the lower portion of said vessel.

11. An apparatus including a cylindrical vessel for contacting gasiform materials with finely divided solids adapted to be maintained as a dense, dry, liquid-simulating fluidized bed in the lower portion of said vessel, an inlet chamber in the bottom portion thereof for the supply of gasiform materials and solids thereto, a circular perforated distribution plate arranged substantially horizontally at the upper portion of said inlet chamber, said plate being concentric with said vessel but of smaller diameter, baffle means including a vertically disposed cylindrical member surrounding said distribution plate and extending above said distribution plate, said cylindrical member being spaced from the inner wall of said vessel to provide an annular passageway for the withdrawal of solids from the fluidized bed adapted to be maintained in said vessel, said baffle means also including an upper baffle member forming an extension of the upper end of said cylindrical member and extending upwardly in said vessel above the maximum level of the dense, dry, liquid-simulating bed adapted to be maintained in said vessel, said baffle means being provided with a multiplicity of restricted openings arranged around said vessel above said perforated distribution plate but below the minimum level of the dense fluidized bed adapted to be maintained in said vessel and leading from the dense fluidized bed adapted to be maintained in said vessel directly into said annular passageway for the withdrawal of solids directly from the dense fluidized bed adapted to be maintained in said vessel into said annular passageway, said restricted openings being of such size to produce a substantial pressure drop through said openings, said annular passageway being provided with radial baffles for subdividing said annular passageway into long narrow stripping sections, a multiplicity of inlet lines arranged around said cylindrical vessel for introducing stripping gas into the lower portion of each of said stripping sections, the upper end of said baffle member being spaced from the inner wall of said vessel to provide an outlet port above the maximum level of the dense fluidized bed adapted to be maintained in said vessel for the discharge of stripping agent and stripped out material released in said annular passageway, an outlet for gasiform material in the upper portion of said vessel and an outlet for solids in the lower portion of said vessel.

LLOYD A. NICOLAI.
BYRON V. MOLSTEDT.

REFERENCES CITED

The following references are of record in the file of this patent:

UNITED STATES PATENTS

| Number | Name | Date |
|---|---|---|
| 2,415,755 | Ogorzaly et al. | Feb. 11, 1947 |
| 2,436,464 | Van Dornick | Feb. 24, 1948 |